United States Patent [19]
Mueller et al.

[11] Patent Number: 5,975,220
[45] Date of Patent: Nov. 2, 1999

[54] MUD SUSPENSION CONTROL SYSTEM

[75] Inventors: Dan T. Mueller, Cypress; Daniel J. Daulton, Southlake, both of Tex.; Phillip J. Rae, Singapore, Singapore; Neil Johnston, West Hill, United Kingdom; Gino DiLullo, Caracas, Venezuela

[73] Assignee: BJ Services Company, Houston, Tex.

[21] Appl. No.: 08/864,207

[22] Filed: May 28, 1997

[51] Int. Cl.[6] .............................. C09K 7/02; E21B 21/00
[52] U.S. Cl. ........................ 175/65; 507/110; 507/211; 507/925
[58] Field of Search ................. 507/110, 269, 507/211, 209, 925, 926; 524/45; 426/276, 578, 584; 166/300; 175/61, 65; 536/123; 106/162.8; 44/280

[56] References Cited

U.S. PATENT DOCUMENTS

| | | | |
|---|---|---|---|
| 2,911,365 | 11/1959 | Burland et al. | 507/119 |
| 3,730,900 | 5/1973 | Perricone et al. | |
| 4,021,545 | 5/1977 | Nair et al. | 424/180 |
| 4,336,145 | 6/1982 | Briscoe | |
| 4,350,601 | 9/1982 | Mosier et al. | |
| 4,371,443 | 2/1983 | Keeney et al. | |
| 4,415,463 | 11/1983 | Mosier et al. | |
| 4,417,415 | 11/1983 | Cysewski et al. | 47/1.4 |
| 4,425,241 | 1/1984 | Swanson | |
| 4,439,328 | 3/1984 | Moity | |
| 4,451,377 | 5/1984 | Luxemburg | 210/708 |
| 4,466,890 | 8/1984 | Briscoe | |
| 4,476,029 | 10/1984 | Sy et al. | 507/119 |
| 4,487,867 | 12/1984 | Almonds et al. | 524/42 |
| 4,488,910 | 12/1984 | Nicholson et al. | |
| 4,488,975 | 12/1984 | Almond | |
| 4,518,040 | 5/1985 | Middleton | 166/307 |
| 4,561,985 | 12/1985 | Glass, Jr. | |
| 4,571,422 | 2/1986 | Symes et al. | 536/114 |
| 4,627,495 | 12/1986 | Harris et al. | 166/280 |
| 4,679,631 | 7/1987 | Dill et al. | 166/307 |
| 4,683,954 | 8/1987 | Walker et al. | 166/307 |
| 4,696,677 | 9/1987 | Colegrove et al. | 536/18.6 |
| 4,753,659 | 6/1988 | Bayerlein et al. | 8/561 |
| 4,798,888 | 1/1989 | Symes et al. | 536/123 |
| 5,016,714 | 5/1991 | McCabe et al. | 166/308 |
| 5,028,342 | 7/1991 | Opitz et al. | |
| 5,154,771 | 10/1992 | Wada et al. | 106/730 |
| 5,174,821 | 12/1992 | Matsuoka et al. | 106/730 |
| 5,330,015 | 7/1994 | Donche et al. | 175/61 |
| 5,362,312 | 11/1994 | Skaggs et al. | 106/189 |
| 5,386,874 | 2/1995 | Laramay et al. | 166/300 |
| 5,391,359 | 2/1995 | Patel | 427/180 |
| 5,416,158 | 5/1995 | Santhanam et al. | 524/760 |
| 5,421,412 | 6/1995 | Kelly et al. | 166/300 |
| 5,447,197 | 9/1995 | Rae et al. | 166/293 |
| 5,504,061 | 4/1996 | Plank | 507/110 |
| 5,514,644 | 5/1996 | Dobson | 507/111 |
| 5,525,587 | 6/1996 | Ladret et al. | 507/110 |
| 5,547,506 | 8/1996 | Rae et al. | 106/730 |
| 5,575,335 | 11/1996 | King | 166/280 |
| 5,607,905 | 3/1997 | Dobson, Jr. et al. | 507/211 |
| 5,723,416 | 3/1998 | Liao | 507/110 |

OTHER PUBLICATIONS

PCT Written Opinion mailed Apr. 20, 1999.
Brochure Entitled "Liquid Stone™ Cementing," BJ Services, 1995.
Brochure Entitled "Carrageenan Marine Colloids, Monograph number one," Marine Colloids Division, FMC Corporation, 1977.

*Primary Examiner*—George Suchfield
*Attorney, Agent, or Firm*—Arnold White & Durkee

[57] ABSTRACT

A drilling fluid additive for controlling solids comprising a carrageenan material, such as iota or kappa carrageenan. The drilling fluid additive may be used with other additives, such as a polyacrylate dispersant. Among other things, the drilling fluid additive may be used to drill deviated or horizontal wells, or wells having large diameter boreholes.

24 Claims, 1 Drawing Sheet

MUD SUSPENSION CONTROL SYSTEM

BACKGROUND OF THE INVENTION

1. Field of the Invention

This invention relates generally to additives for modifying suspension properties of drilling fluids. More specifically, this invention relates to solids control properties of drilling fluids used in wells drilled under extreme conditions, such as horizontal or deviated wells, or wells with large boreholes. In particular, this invention relates to the use of a carrageenan, such as iota or kappa carrageenan, as a suspending agent in a drilling mud system.

2. Description of Related Art

The control of solids is of vital concern during drilling and workover operations. Such solids typically include fluid weighting agents and formation solids acquired while drilling. For example, drilling mud is typically a mixture of refined clays, such as bentonite, and water. Fluid weighting agents, such as barite, and other chemicals for varying suspension and Theological properties of a fluid are also typically present in drilling mud.

Drilling mud and other drilling fluids are employed to serve many functions. For example, during drilling operations, drilling mud is typically pumped or injected down a drill pipe string and through a drilling bit. The drilling mud is then circulated upward in the annular space between the walls of the borehole and the pipe string. The hydrostatic pressure of drilling mud maintains borehole stability by preventing the collapse of unstable formations into the hole and preventing the intrusion of fluids from exposed formation strata. At the same time, the circulated mud continuously flushes formation cuttings from around the drill bit and removes these cuttings from the borehole by conveying them upwards toward the surface in the annular drilling space. A similar function may be performed using drilling mud or other types of drilling fluids during remedial operations, such as workovers and recompletions. In some cases, a drilling fluid may be reverse circulated by injecting the fluid down a wellbore annulus and circulating the fluid up an inner pipe string.

To ensure adequate removal of solids, a drilling fluid should have a sufficient viscosity and bearing capacity such that formation cuttings or other solids are suspended in the fluid. Moreover, it is often desirable that a drilling mud be capable of suspending solids even when the mud is stationary. During drilling operations, a drilling fluid having inadequate solids control or suspension characteristics will typically result in a poor rate of drilling penetration and/or may result in the buildup or deposition of solids within the borehole.

In the drilling of vertical or near vertical boreholes, upward flow of drilling mud in the annular drilling space typically tends to be uniform and laminar. This type of flow is conducive to removal and transportation of formation cuttings through the annular drilling space to the surface. To further ensure complete removal of cuttings and to prevent particle fallback, the carrying capacity of drilling muds is often increased by increasing the viscosity of the mud to a point that formation cuttings are held in near suspension in the mud when the mud flow rate is at or near stationary.

When drilling or conducting workover operations in highly directional or horizontal wells, upward flow of mud in the wellbore tends to be less uniform than in more vertically oriented wells. As a result, particle fallback is more difficult to control, and a layer of solids may accumulate on the low side (bottom) of deviated or horizontal sections of a wellbore. Accumulation of particles and cuttings within a well may be greatest in regions of inclination changes. During drilling, problems associated with accumulation of solid particles or cuttings include reduction in particle removal and associated increases in friction and decreases in rate of penetration. In extreme cases, accumulations of solid particles may result in sticking of the bit and/or pipe string. Once formed, a layer of solids or cuttings is typically not easily removed by hydraulic or mechanical means. In addition, obtaining zonal isolation with cement in the presence of a layer of drilling solids is difficult because such a layer interferes with formation of a pressure tight structure. This may result in a loss of hydraulic integrity due to fluid movement through the layer of drilling solids deposited underneath the cement sheath of a completed well.

Solids accumulation problems may also be encountered when drilling boreholes of relatively large diameter, such as those having a diameter greater than about 16 inches. These wells usually traverse shallow and poorly consolidated formations and are typically drilled using high rates of penetration. Drilling of large diameter boreholes is further typically complicated by a large volume of cuttings that must be removed from the borehole and by large volumes of drilling fluid and relatively high fluid circulation rates to suspend and remove these cuttings. In some cases, water is used as a drilling fluid to save expense and storage space associated with large volumes of drilling mud containing clays such as bentonite. However use of water in this context requires high circulation rates that may result in leaching of borehole walls. In addition, cuttings and other solids typically settle out when drilling and fluid circulation is stopped, resulting in drilling difficulties when drilling and circulation is reinitiated.

In the past, one solution for addressing solids accumulation and removal problems during operations on highly deviated wells has been to vary the flow conditions of a drilling fluid. For example, fixed volume or "spacers" of drilling mud having viscosities less than or greater than the bulk of a drilling mud may be periodically pumped into a well to create turbulence or plug flow within the drilling space annulus. However, this solution complicates the drilling procedure and may be only partially effective.

In other cases, oil based or oil emulsion drilling fluids have been employed to increase the carrying capacity and lubricity of a drilling system. However, these muds are expensive and typically present environmental problems.

SUMMARY OF THE INVENTION

In one respect, this invention is a method of conducting operations on a well having a borehole, including introducing a drilling fluid containing a carrageenan into the well. The carrageenan may be at least one of kappa carrageenan, iota carrageenan, or a mixture thereof. In one embodiment, the carrageenan is an iota carrageenan having a molecular weight of between about 75,000 and about 500,000. The drilling fluid may further include a dispersant that is at least one of a polyacrylate, sulfonated styrene maleic anhydride, lignin, tannin, or a mixture thereof. In this method, the drilling fluid may include from about 0.2 kg/m$^3$ to about 8.5 kg/m$^3$ iota carrageenan and/or further include from about 0.7 kg/m$^3$ to about 28 kg/m$^3$ polyacrylate dispersant. In one embodiment, the borehole may be oriented at an angle of between about 30° and about 90° with respect to the vertical. In another embodiment, the borehole may have a diameter of greater than about 16 inches.

In another respect, this invention is a method of drilling a well including the step of drilling a borehole oriented at an angle with respect to the vertical of between about 30° and about 90° in the presence of a drilling mud comprising a carrageenan. The drilling mud may optionally include bentonite. The carrageenan may be at least one of kappa carrageenan, iota carrageenan, or a mixture thereof. In one embodiment, the carrageenan is an iota carrageenan having a molecular weight of between about 75,000 and about 500,000. The drilling fluid may further include a dispersant that is at least one of a polyacrylate, sulfonated styrene maleic anhydride, lignin, tannin, or a mixture thereof. In this method, the drilling fluid may include from about 0.2 kg/m$^3$ to about 8.5 kg/m$^3$ iota carrageenan and/or further include from about 0.7 kg/m$^3$ to about 28 kg/m$^3$ polyacrylate dispersant.

In another respect, this invention is a method of conducting operations on a well having a borehole, in which a drilling fluid including an iota carrageenan is introduced into the well. The iota carrageenan may have a molecular weight of between about 150,000 and about 500,000, further include a dispersant that is at least one of a polyacrylate, sulfonated styrene maleic anhydride, lignin, tannin, or a mixture thereof, and may also include from about 0.2 kg/m$^3$ to about 8.5 kg/m$^3$ iota carrageenan and from about 0.7 kg/m$^3$ to about 28 kg/m$^3$ polyacrylate dispersant. The borehole of the well may be oriented at an angle of between about 30° and about 90° with respect to the vertical.

In another respect, this invention is a drilling fluid comprising carrageenan. The carrageenan may be at least one of kappa carrageenan, iota carrageenan, or a mixture thereof. In one embodiment, the carrageenan is an iota carrageenan having a molecular weight of between about 75,000 and about 500,000. The drilling fluid may further include a dispersant that is at least one of a polyacrylate, sulfonated styrene maleic anhydride, lignin, tannin, or a mixture thereof. The drilling fluid may include from about 0.2 kg/m$^3$ to about 8.5 kg/m$^3$ iota carrageenan, and/or from about 0.7 kg/m$^3$ to about 28 kg/m$^3$ polyacrylate dispersant.

In another respect, this invention is a drilling fluid including an iota carrageenan and a dispersant in which the iota carrageenan has a molecular weight of between about 150,000 and about 500,000, and the dispersant is at least one of a polyacrylate, sulfonated styrene maleic anhydride, lignin, tannin, or a mixture thereof.

DETAILED DESCRIPTION OF THE INVENTION

Figure 1:
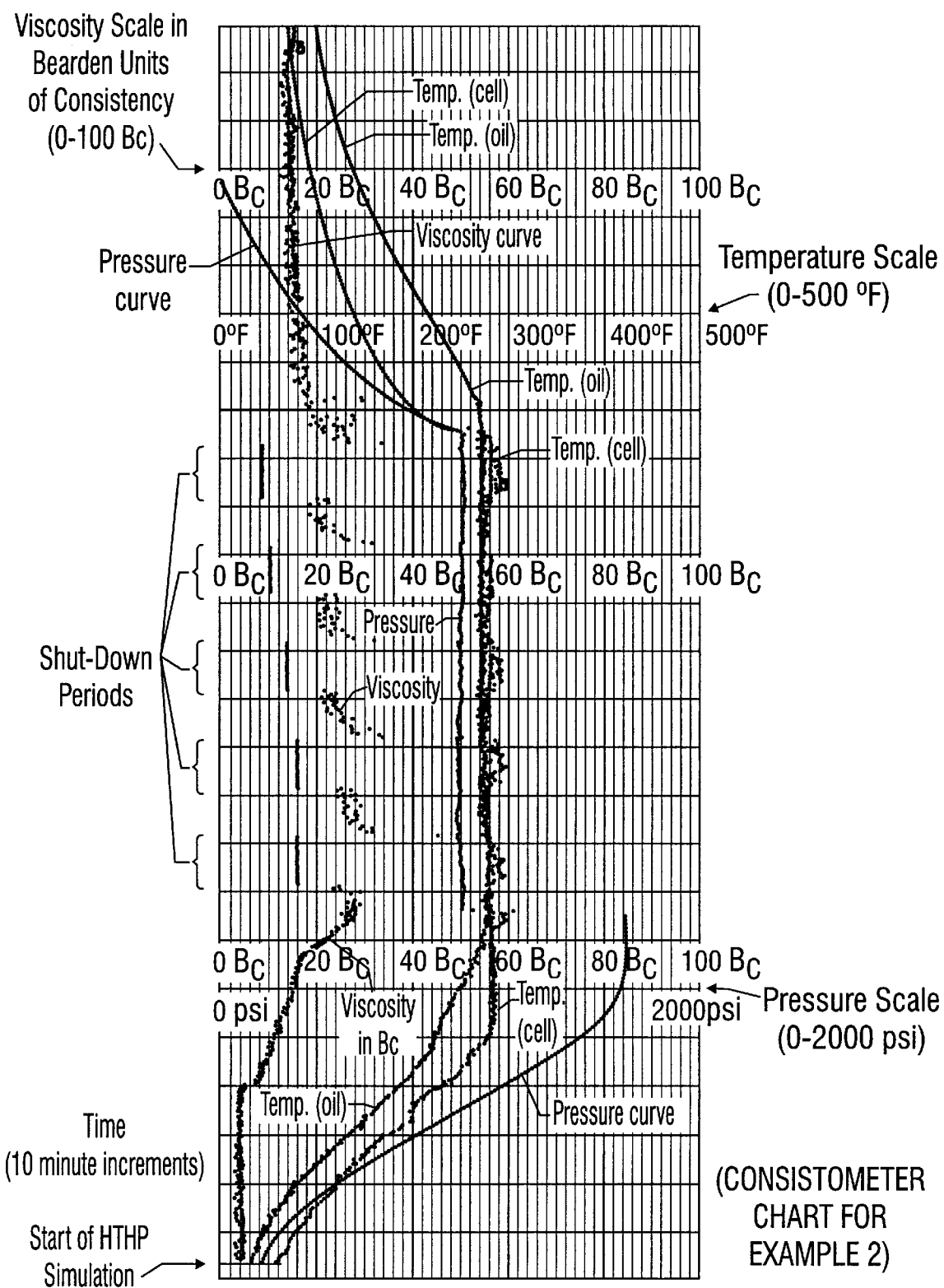
FIG. 1 shows mud viscosity variations during the rheological tests of Example 2.

Using the disclosed method, carrageenan based suspending agents are used in drilling fluids. These suspending agents may optionally be used in a system combined with a dispersant, such as polyacrylate, for rheology control. As used herein, "drilling fluid" means any fluid suitable for use in conducting well operations such as drilling, completion, workover, or remedial operations. Examples of drilling fluids include any type of fluid that may be introduced into a wellbore during such well operations including, but not limited to, drilling muds, completion fluids, workover fluids, packer fluids, and drill-in fluids. In the present disclosure, "introduced into a wellbore" means that a fluid may be pumped, injected, poured, released, displaced, spotted, circulated or otherwise placed within a well or wellbore using any suitable manner known in the art.

Advantageously, modification of drilling fluids using the disclosed methods and compositions allows for formulation of drilling fluids with acceptable rheologies, yet superior solids support capability. Such fluids are particularly desirable, for example, when drilling wells under conditions where solids accumulation problems are most severe, such as in wells with large boreholes or in deviated or horizontal environments. Other typical applications include drilling or remedial operations carried out in wellbores having relatively large annular circulation areas and/or low circulation velocities. These include applications in which solids are circulated out of a relatively large open or cased hole using a relatively small inner string of pipe, such as deepenings or clean outs carried out with coiled tubing. Therefore, the disclosed method provides a relatively inexpensive and reliable solids control system that offers acceptable rheological characteristics and improved solids support capability for drilling or performing remedial operations in deviated, horizontal, large hole or other environments where solids accumulation problems are typically encountered.

Carrageenans, or carrageenan gums, are typically derived from seaweed and are ionic linear polysaccharides comprising repeating galactose units which individually may be sulfated or unsulfated. Specific carrageenan types include kappa, iota and lambda carrageenans. Typically iota or kappa carrageenan are employed, and most typically iota carrageenan is employed. However, mixtures of all three types of carrageenan are possible. Properties of individual carrageenan types primarily depend on the number and position of sulfate groups on the repeating galactose units. In the presence of excess cations, kappa and iota carrageenans form gels. Cations that may be associated with carrageenan sulfate groups include, but are not limited to, ammonium, calcium, magnesium, potassium, and sodium cations. In addition to carrageenan materials, it is contemplated that other high molecular weight sulfated polysaccharides having repeating galactose units may also be employed. Examples of such polysaccharides include, but are not limited to, carrageenan-like materials, furcellaran, agar-agar, and mixtures thereof.

In the practice of the disclosed method and compositions, any carrageenan or carrageenan-like material suitable for forming a gel (including thixotropic gels) and/or otherwise acting as a suspending agent may be employed. In the practice of the disclosed method, carrageenan materials are employed. Typically an iota or kappa carrageenan is employed. Most typically an iota carrageenan is used. Iota carrageenan is one of three closely related polymers consisting of substituted galactogalactose. Iota carrageenan primarily comprises repeating D-galactose and 3, 6 anhydro-D-galactose units, both sulfated and non-sulfated, joined by alternating 1–3 and β1–4 glycosidic linkages. For example, in one embodiment of the disclosed method, an iota carrageenan typically comprises about 30% 3, 6 anhydrogalactose and about 32% ester sulfate. However, any other form of iota carrageenan or variant or modification thereof may also be employed. Although iota carrageenan is typically employed in calcium environments, it may be employed in environments containing other types of cations including, but not limited to, potassium, magnesium, etc. Most typically, a divalent cation is employed with iota-carrageenan. In another embodiment, kappa carrageenan may be employed in, for example, typically potassium environments. However, as mentioned above, kappa carrageenan may be employed with other ions as well. Kappa carrageenan has a similar structure to iota carrageenan but differs in amount of 3, 6 anhydrogalactose and number and position of ester sulfate groups. In one embodiment a kappa carrageenan typically comprises about 34% 3, 6 anhydrogalactose and about 25% ester sulfate. However, any other form of kappa carrageenan or variant or modification thereof may also be employed.

Iota carrageenan is substantially salt-tolerant and forms substantially soft, elastic gels when exposed to cations. Such gels may be formed by exposing iota carrageenan to any suitable cation. As previously mentioned, cations employed are typically divalent, such as calcium and magnesium. However, other types of cations, such as potassium, may be employed. Most typically, iota carrageenan gels are formed in the presence of calcium cations. These gels tend to be linear in nature, without cross-linking, and form helical self-structuring polymer chains in the presence of calcium ions. Advantageously, the elastic nature of an iota carrageenan gel, its stability in the presence of calcium ions and high pH, as well as its tendency to reform or re-gel after shearing, make it ideal as a suspending agent for use in drilling fluids. However, other forms of carrageenan, such as kappa carrageenan (which produces a more brittle gel that tends not to reform or re-gel after shear), may also be employed.

Although any carrageenan suitable for forming gels and/or otherwise acting as a suspension agent in a calcium environment may be employed in the disclosed method (including those carrageenans having a molecular weight greater than about 500,000 and less than about 75,000), typically a carrageenan has a molecular weight of between about 75,000 and about 500,000. More typically in the practice of the disclosed method, a carrageenan has a molecular weight of between about 150,000 and about 250,000, and even more typically a carrageenan has a molecular weight of about 200,000. Most typically, an iota carrageenan having these molecular weight ranges is employed. Carrageenans having any viscosity suitable for use for a selected application may be employed in the disclosed method, however in one embodiment the viscosity of a 1.5% iota carrageenan solution at 75° C. and 60 RPM is between about 30 mPa.s and about 60 mPa.s.

A specific example of a suitable iota carrageenan composition for use in the disclosed method is commercially available as "VISCARIN SD-389" available from FMC Food Ingredients Division. This product is also known as "LSS-1" from BJ Services Company. Other iota carrageenan examples include "GELCARIN GP-359," "GELCARIN GP-379," and "SEASPEN IN" (which also contains phosphates and $CaSO_4 \cdot 2H_2O$), also available from FMC Food Ingredients Division. Specific examples of suitable kappa carrageenan compositions for use in the disclosed method are "GELCARIN GP-911" and/or "GELCARIN GP-812," both available from FMC Food Ingredients Division. An example of a mixed kappa/lambda carrageenan mixture is "VISCARIN GP-328," also available from FMC Food Ingredients Division. In addition to these carrageenans, other suitable commercially available carrageenan compositions include, but are not limited to, carrageenan materials available from FMC Europe NV of Brussels Belgium; Chemcolloids Ltd. of Bosley, UK; Aqualon, Reigate, Surrey, UK; and Ashland Chemical Company, Dublin, Ohio. Further information on carrageenans may be found in "Carrageenan", Monograph Number One, Marine Colloids Division, FMC Corporation; "Marine Colloids Carrageenan, General Technology for Pharmaceutical and Other Applications," FMC Corporation, 1993, which are incorporated herein by reference in their entirety.

In the practice of the disclosed method, gelling cations may be supplied to carrageenan-containing solutions directly by adding, and/or as part of other components of a drilling fluid. For example, in the case of drilling fluids containing iota carrageenans, calcium cations may be supplied to a solution as calcium carbonate, calcium oxide, calcium hydroxide, lime, other calcium containing compounds, etc.

Advantageously, when carrageenan is added to a water based drilling mud, improved removal of solids and cuttings from a wellbore is achieved and accumulation of drill cuttings in a wellbore reduced. Although these benefits may be realized when embodiments of the disclosed method are used under any drilling or remedial conditions, this advantage is particularly significant when the disclosed method is used in the drilling of wells with large boreholes and/or wells that have boreholes that are deviated or horizontal.

Benefits of the carrageenan suspending agents of the disclosed method may be realized in the drilling of vertical wells, horizontal wells, or deviated wells having an angle of deviation of between about 0° and about 90° with respect to the vertical. However, these suspending agents are advantageously employed in horizontal wells or deviated wells having an angle with respect to the vertical of between about 30° and about 90°, most typically between about 75° and about 90°. Furthermore, it will be understood with benefit of this disclosure that in other embodiments the disclosed suspending agents may be employed in deviated wells having an angle of deviation greater than about 90°. Similarly, the suspending agents of the disclosed method may be employed in the drilling of wells having any borehole size, typically those wells having a borehole size greater than about 4 inches. However the disclosed suspending agents are most advantageously used in the drilling of large-diameter wells having wellbores of typically greater than about 16 inches, and most typically greater than about 20 inches. In the practice of the disclosed method, the disclosed suspension agents may be employed in any wellbore having a maximum borehole temperature at which the suspending qualities of a suspending agent are not substantially degraded. Typically, the disclosed suspension agents are employed in wellbores having maximum borehole temperatures ranging from about 60° F. to about 400° F., and more typically from about 120° F. to about 250° F., although they may be employed in wellbores having greater or lower temperatures.

In the practice of the disclosed method, a drilling fluid may utilize any suitable aqueous base including, but not limited to, seawater, brine, or water containing components such as calcium, ammonium, magnesium, potassium, or mixtures thereof. Drilling fluids containing the disclosed carrageenan suspending agents may be prepared by mixing, hydrating and gelling the components of a drilling fluid system using methods and equipment known in the art for formulating polymer-containing drilling fluids. In formulating a drilling fluid employing the disclosed carrageenan suspending agents, a carrageenan polymer material is typically added directly to other components of an aqueous based drilling fluid (including water) or, alternatively may be hydrated with fresh water prior to exposure to ions in a drilling fluid or mud, or hydrated in an aqueous base fluid that contains ions.

In the practice of the disclosed method, it is not necessary for a carrageenan to be hydrated. It is only necessary that the carrageenan be allowed to swell in the presence of suitable cations, such as calcium, magnesium and/or potassium. This may be accomplished at temperature of about 20° C. Alternatively, to obtain a more filly developed or higher viscosity, a carrageenan may be hydrated prior to addition to a drilling fluid and/or exposure to ions. In this case, some iota carrageenan materials may require heating to above the solubility temperature to achieve hydration, for example to about 80° C. Such iota carrageenan materials include "hot water soluble" iota carrageenans, such as "GELCARIN GP359" or "GELCARIN GP-379" available from FMC Marine Colloids Division. In other cases, an iota carrageenan material may be hydrated without prior heating in the present of sodium ions. Examples of such iota carrageenan materials include "cold water soluble" iota carrageenans, which are soluble at temperatures of about 20° C. without prior heating as long as sodium ions are present, such as in the form of sodium hydroxide or sodium carbonate. These "cold water soluble" iota carrageenans may swell in the presence of divalent calcium ions to form thixotropic dispersions, even in the absence of sodium. Such cold water iota carrageenan materials include iota carrageenans, such as "VISCARIN SD-389" available from FMC Marine Colloids Division.

Similar to iota carrageenans, kappa carrageenans are available in, among other things, "hot water soluble" and "hot water/partial cold water soluble" forms. The "hot water/partial cold water soluble" form is soluble at about 20° C. in the presence of sodium, and swellable in the presence of potassium, calcium, and ammonium. An example of hot water/partial cold water kappa carrageenan is "GELCARIN GP-911. The "hot water form" requires heating to about 80° C. for hydration. An example of the hot water form of kappa carrageenan is "GELCARIN GP-812."

In the practice of the disclosed method, an iota or kappa carrageenan suspending agent of the disclosed method may be employed in drilling fluids having any pH and salinity range suitable for a particular drilling application. However, the pH of a fluid is typically between about 7 and about 11.5.

Carrageenan suspending agents of the disclosed method may be added to a water based drilling fluid in any quantity suitable for obtaining desired fluid suspension properties. In one typical embodiment, a sufficient quantity of iota carrageenan is added to a drilling fluid in order to result in between about 0.2 kg/m$^3$ and about 8.5 kg/m$^3$ of iota carrageenan in the final drilling fluid solution. Most typically, sufficient iota carrageenan is added to result in between about 0.5 kg/m$^3$ and about 2 kg/m$^3$ of iota carrageenan in the final fluid solution. When kappa carrageenan is employed, it is contemplated that higher concentrations may be necessary to achieve similar viscosities. Gelation may be obtained using any concentration of cations suitable for gelling an iota carrageenan material. Concentration of cations required for gelation typically depends on type and amount of iota carrageenan employed, as well as the gel qualities desired for an individual application. In addition, increased cation concentration may be required to obtain similar gelation at higher temperatures With benefit of this disclosure, selection and optimization of cation concentration may be achieved using methods and techniques known in the art. As previously described, these cations may be added separately, and/or may be present in other components of a drilling fluid.

Although not necessary to the practice of the disclosed method, a dispersant is typically added to a drilling fluid system to provide a slurry with good rheological characteristics. These characteristics include high viscosities with yield stress behavior at low shear rates denoting solids carrying capacity away from the drill bit, and relatively low viscosities at higher shear rates in the vicinity of the drill bit to minimize torque requirements. Any range of viscosity and shear rates suitable or desirable for use in a drilling fluid may be formulated using the disclosed method and compositions. However, typical slurries have Fann readings of between about 175 and about 90 at shear rates of between about 1021 sec$^{-1}$ (600 RPM) and about 510 sec$^{-1}$ (300 RPM) and viscosities of about 20 to about 15 at shear rates of between about 10.2 sec$^{-1}$ (6 RPM) and about 5.1 sec$^{-1}$ (3 RPM).

Acceptable dispersants include any of those dispersant additives known in the art to be suitable for use in drilling fluids. Examples of such dispersants include, but are not limited to, polyacrylates, sulfonated styrene maleic anhydrides, lignins, tannins, and mixtures thereof. Polyacrylate dispersants may be any cation salt-based polyacrylate, including, but not limited to sodium polyacrylate. Most typically, an acrylic acid homopolymer/sodium polyacrylate dispersant, such as "BEVALOID 6670" commercially available from Rhone Poulanc is employed. This dispersant is also available from B.J. Services as "LSP-1 LIQUID STONE PLASTICIZER." Any amount of dispersant additive suitable for use in a drilling fluid may be employed. In a typical embodiment of the disclosed method containing a dispersant, a final drilling fluid solution is formulated to contain from about 0.7 kg/m$^3$ to about 28 kg/m$^3$ polyacrylate dispersant. Most typically, the polyacrylate dispersant is present in an amount from about 5.7 kg/m$^3$ to about 11.4 kg/m$^3$.

In addition to a carrageenan suspending agent such as iota carrageenan, and a dispersant such as sodium polyacrylate, any suitable drilling fluid additive or mixture of additives known to those of skill in the art may also be employed. Such additives include, but are not limited to, dispersants, weighting agents, electrolytes, viscosifiers, corrosion inhibitors, bactericides, deflloculants, and mixtures thereof. Included among these additives are weighting materials such as barite, chalk, iron oxides, silica, etc. Electrolytes such as sodium chloride, potassium chloride or other salts may also be used. Specific examples of other salt salts include, but are not limited to, alkali or alkaline-earth metal salts such as CaCl$_2$, CaBr$_2$, NaBr$_2$, ZnBr$_2$ or the like, as well as admixtures of these and other salts such as CaBr$_2$/ZnBr$_2$, NaBr$_2$/NaCl$_2$ CaCl$_2$/CaBr$_2$/ZnBr$_2$. Any other conventional drilling fluid additives may also be employed including, but not limited to, emulsifiers, calcium carbonate, magnesia, lignosulfate salts such as chromium or calcium lignosulfates, and other agents.

Drilling fluids may also be formulated with one or more clays including, but not limited to, bentonite, attapulgite, sepiolite, and mixtures thereof. In addition to clays, drilling fluids may also include other gums (such as xathan, welan, scleroglucan, etc. and mixtures thereof), mixed metal anhydrides, or any other suitable viscosifier/gelling agents. It will be understood with benefit of this disclosure that these and other additives, including the carrageenan suspending agents and dispersants of the disclosed method, may be employed in any combination or mixture desired. It will also be understood that any given additive or combination of additives may or may not be present in any given wellbore, and that their selection will be dependent on other additives and the use for which the drilling mud is intended.

In the practice of the disclosed method, a drilling fluid may be formulated to have any desired characteristics suitable for use in drilling or conducting remedial operations on a well. In this regard, amounts of carrageenan suspending agent and dispersant may vary depending on several factors, such as wellbore deviation, borehole size, formation type, downhole conditions, and/or selected drilling fluid components. With benefit of this disclosure, selection and optimization of suspending agent and dispersant may be accomplished using methods and techniques known in the art. For example, in one embodiment a typical drilling fluid for use in drilling deviated or horizontal wells using the disclosed method has a density of from about 9 to about 20 lbs. per gal., and a viscosity between about 175 centipoise and about 30 centipoise at 80° F. as measured on the Fann 35A viscometer at 300 rpm. The bentonite content of a drilling mud of this embodiment is typically in the range of from about 2 to about 50 lbs/barrel bentonite.

In the practice of the disclosed method, carrageenan materials and other additives may be used to form a drilling fluid using any suitable manner known to those of skill in the art, such as those methods and techniques typically used for mixing polymer-containing drilling fluids. For example, in one embodiment of the disclosed method carrageenan suspending agents are added to a water based drilling fluid in the form of a free-flowing dry powder. A polyacrylate dispersant is typically added in the form of a liquid additive. In another embodiment, an iota carrageenan material is added to slowly to fresh potable water to permit substantially full hydration without formation of lumps. Time for hydration typically depends on polymer grade and temperature required. Following hydration, other components, including dispersant and weighting agents may be added and mixed.

A carrageenan material may also be incorporated into a drilling fluid in other ways, such as a polymer dispersion in an organic base fluid which is then combined with an aqueous carrier fluid. In addition, a drilling fluid containing the disclosed carrageenan material may be formulated in a number of other ways. For example, such a drilling fluid may be prepared off-site and transported to a well location, batch mixed on location, or prepared using a "continuous mix" process on location.

EXAMPLES

The following examples are illustrative and should not be construed as limiting the scope of the invention or claims thereof.

Example 1

A sample of a 16.5 lb/gal mud obtained from a horizontal well was evaluated for rheological modification. Prior to this test the sample had separated into distinct fluid and solid phases. A solid phase, composed mostly of drill solids, occupied in excess of 80% of the volume of sample. The solids content increased at the bottom of the sample, with only fine particulates being found at the top of the sample, indicating instability of the fluid. The sample had the consistency of a 70 $B_c$ (Bearden Units of consistency) cement. The initial rheologies of the sample are noted in Table 1. The sample was then spooned out of the container and re-homogenized (re-sheared) using a high-speed lab mixer for about 5 minutes at about 1500 RPM and 80° F. The mixing re-fluidized the sample for a short period of time, the rheologies after shearing are noted in Table 1.

To a 350 mL sample of the mud was added 0.25 g of "LSS-1" carrageenan suspending agent and 3 g of "LSP-1" polyacrylate dispersant. As shown in Table 1, the sample viscosity was reduced to a 300 RPM dial reading of 100 centipoise on a Fann 35A rheometer at 80° F. after 15 seconds of mixing. This sample was retained for one week with no change in rheology and no solid settling noted. Thus, with the addition of the additives the mud regained and retained its fluidity at ambient temperature.

TABLE 1

Rheological Properties of Drilling Mud Sample of Example 1

Initial Rheologies @ 80° F.

(Fann 35A RPM's/Dial Readings)
600/300+   300/300+   200/300+   100/300+   6/150   3/110
Rheologies After Re-Shearing With a Lab Mixer @ 80° F.

(Fann 35A RPM's/Dial Readings)
500/300+   300/227   200/195   100/165   6/70   3/35
Rheologies After Treatment with ¼ ppb LSS-1 + 3 ppb LSP-1 @ 80° F.

(Fann 35A RPM's/Dial Readings)
600/155   300/100   200/77   100/53   6/16   3/12

Example 2

Having established the ambient temperature stability of the mud of Example 1 (including the carrageenan suspending agent and polyacrylate dispersant), a high temperature, high pressure ("HTHP") simulation was next performed. The test was carried out on a variable speed HTHP consistometer. A rotational speed of 53 rpm was chosen to simulate the shear conditions found in a 6.5 inch by 4 inch annulus at 5.7 barrels per minute flow rate (53 rpm equates to a shear rate of approximately 225 $\sec^{-1}$).

As shown in FIG. 1, the mud sample was ramped to a temperature of 300° F. in 50 minutes with the pressure being allowed to climb to 17,000 psi. The pressure was later reduced to 10,000 psi for the shut-down cycles. As indicated in FIG. 1, the sample had an initial consistency of 4 $B_c$. The viscosity rose to 28 $B_c$ at the end of the temperature ramp. The sample was exposed to five shut-down cycles, with a maximum deflection of 60 $B_c$ being noted. This indicated that the solid suspension was stable, even after quiescence for a period of time of 10 minutes at 300° F.

On average, the viscosity of the system returned to a sub-30 $B_c$ during the on-cycles. The static viscosity of the system declined only marginally from 16 $B_c$ during the first shut-down to 10 $B_c$ at the last shut-down, indicating the retention of viscosity under severe conditions. On average, the dynamic viscosity of the fluid ranged from 25 $B_c$ after the first shut down to approximately 20 $B_c$ after the last shut down. These data indicate that the fluid is maintaining its viscosity, even after repeated shut down and re-shear. After the test, the mud sample was removed and checked for settling. No settling was noted. Thus, the results of Example 2 show that an exceptionally stable, and rheologically enhanced drilling fluid was produced from a very viscous, unstable mud using the disclosed carrageenan and dispersant additives.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of conducting operations on a well having a borehole, comprising introducing into said well a drilling fluid comprising a carrageenan; wherein said borehole is oriented at an angle of between about 30° and about 90° with respect to the vertical, wherein said borehole has a diameter of greater than about 16 inches, or wherein said borehole is oriented at an angle of between about 30° and about 90° with respect to the vertical and has a diameter of greater than about 16 inches.

2. The method of claim 1, wherein said carrageenan is at least one of kappa carrageenan, iota carrageenan, or a mixture thereof.

3. The method of claim 1, wherein said carrageenan is a carrageenan having a molecular weight of between about 75,000 and about 500,000.

4. The method of claim 1, wherein said drilling fluid further comprises a dispersant, said dispersant being at least one of a polyacrylate, sulfonated styrene maleic anhydride, lignin, tannin, or a mixture thereof.

5. The method of claim 1, wherein said drilling fluid comprises from about 0.2 kg/m$^3$ to about 8.5 kg/m$^3$ iota carrageenan.

6. The method of claim 1, wherein said drilling fluid comprises from about 0.2 kg/m$^3$ to about 8.5 kg/m$^3$ iota carrageenan and further comprises from about 0.7 kg/m$^3$ to about 28 kg/m$^3$ polyacrylate dispersant.

7. The method of claim 1, wherein said carrageenan is an iota carrageenan, and wherein said borehole is oriented at an angle of between about 30° and about 90° with respect to the vertical.

8. The method of claim 1, wherein said carrageenan is an iota carrageenan, and wherein said borehole has a diameter of greater than about 16 inches.

9. A method of drilling a well, comprising drilling a borehole oriented at an angle with respect to the vertical of between about 30° and about 90° in the presence of a drilling mud comprising a carrageenan.

10. The method of claim 9, wherein said drilling mud comprises bentonite.

11. The method of claim 9, wherein said carrageenan is at least one of kappa carrageenan, iota carrageenan, or a mixture thereof.

12. The method of claim 11, wherein said carrageenan is an iota carrageenan having a molecular weight of between about 75,000 and about 500,000.

13. The method of claim 9, wherein said drilling mud further comprises a dispersant, said dispersant being at least one of a polyacrylate, sulfonated styrene maleic anhydride, lignin, tannin, or a mixture thereof.

14. The method of claim 9, wherein said drilling mud comprises from about 0.2 kg/m$^3$ to about 8.5 kg/m$^3$ iota carrageenan.

15. The method of claim 9, wherein said drilling mud comprises from about 0.2 kg/m$^3$ to about 8.5 kg/m$^3$ iota carrageenan and further comprises from about 0.7 kg/m$^3$ to about 28 kg/m$^3$ polyacrylate dispersant.

16. A method of conducting operations on a well having a borehole, comprising introducing into said well a drilling fluid comprising an iota carrageenan; wherein said borehole is oriented at an angle of between about 30° and about 90° with respect to the vertical, said borehole has a diameter of greater than about 16 inches, or wherein said borehole is oriented at an angle of between about 30° and about 90° with respect to the vertical and has a diameter of greater than about 16 inches.

17. The method of claim 16, wherein said iota carrageenan has a molecular weight of between about 150,000 and about 500,000.

18. The method of claim 17, wherein said drilling fluid further comprises a dispersant, said dispersant being at least one of a polyacrylate, sulfonated styrene maleic anhydride, lignin, tannin, or a mixture thereof.

19. The method of claim 18, wherein said drilling fluid comprises from about 0.2 kg/m$^3$ to about 8.5 kg/m$^3$ iota carrageenan.

20. The method of claim 19, wherein said drilling fluid comprises from about 0.2 kg/m$^3$ to about 8.5 kg/m$^3$ iota carrageenan and from about 0.7 kg/m$^3$ to about 28 kg/m$^3$ polyacrylate dispersant.

21. The method of claim 20, wherein said borehole is oriented at an angle of between about 30° and about 90° with respect to the vertical.

22. The method of claim 1 wherein said drilling fluid has a viscosity reading of between about 175 centipoise and about 90 centipoise at 80° F. as measured on a Fann 35A rheometer at between about 600 RPM and about 300 RPM; and has a viscosity reading of between about 20 centipoise and about 15 centipoise at 80° F. as measured on a Fann 35A rheometer at between about 6 RPM and about 3 RPM.

23. The method of claim 9 wherein said drilling mud has a viscosity reading of between about 175 centipoise and about 90 centipoise at 80° F. as measured on a Fann 35A rheometer at between about 600 RPM and about 300 RPM; and has a viscosity reading of between about 20 centipoise and about 15 centipoise at 80° F. as measured on a Fann 35A rheometer at between about 6 RPM and about 3 RPM.

24. The method of claim 16 wherein said drilling fluid has a viscosity reading of between about 175 centipoise and about 90 centipoise at 80° F. as measured on a Fann 35A rheometer at between about 600 RPM and about 300 RPM; and has a viscosity reading of between about 20 centipoise and about 15 centipoise at 80° F. as measured on a Fann 35A rheometer at between about 6 RPM and about 3 RPM.

* * * * *